Aug. 9, 1932.    O. R. BRISTOW ET AL    1,870,891
LAWN AND GARDEN IMPLEMENT
Filed Sept. 15, 1930
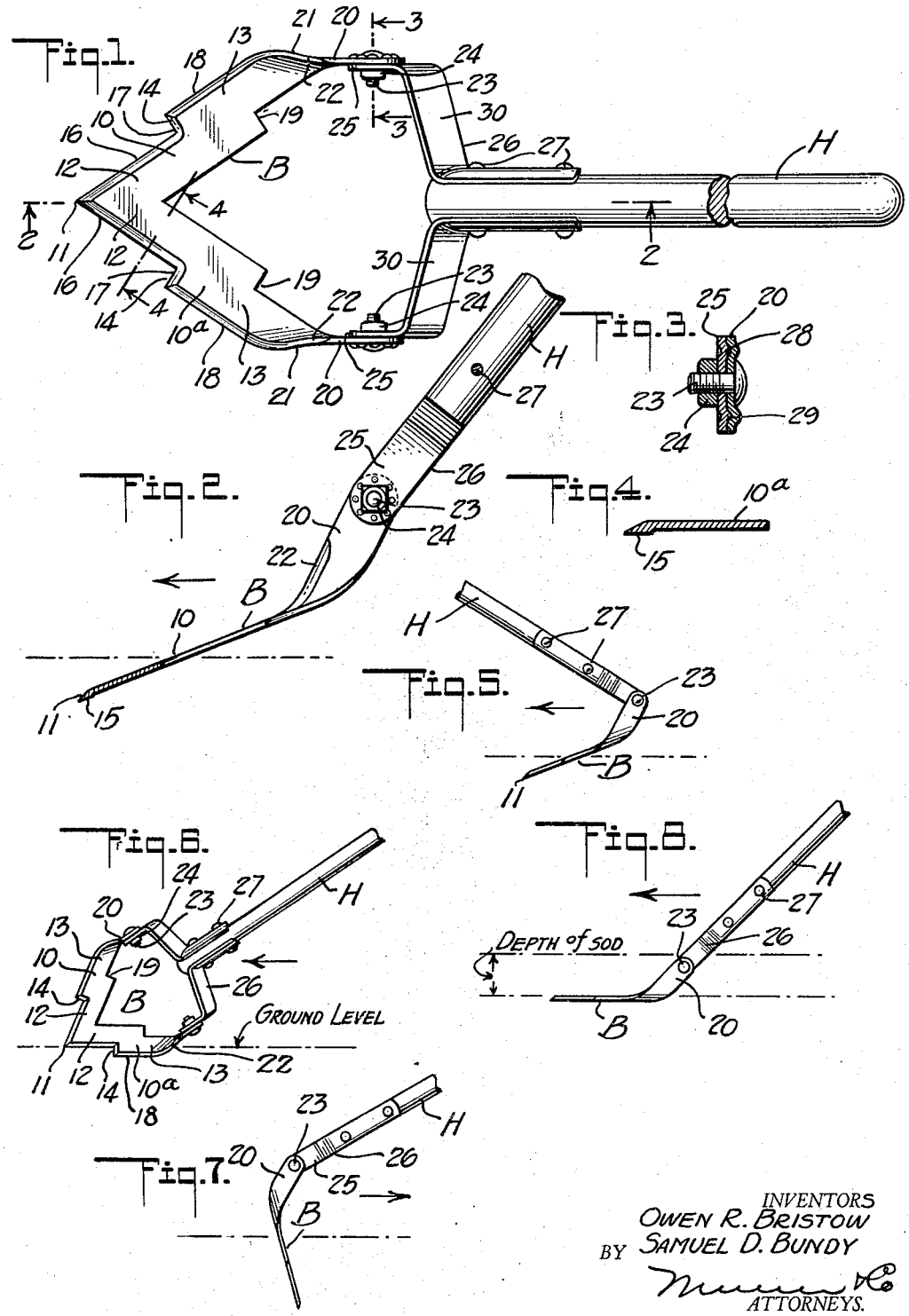
INVENTORS
OWEN R. BRISTOW
BY SAMUEL D. BUNDY
ATTORNEYS.

Patented Aug. 9, 1932

1,870,891

UNITED STATES PATENT OFFICE

OWEN R. BRISTOW AND SAMUEL D. BUNDY, OF SAN BERNARDINO, CALIFORNIA; SAID BUNDY ASSIGNOR TO SAID BRISTOW

LAWN AND GARDEN IMPLEMENT

Application filed September 15, 1930. Serial No. 482,031.

Our invention relates to and has for a purpose the provision of a simple, rugged and inexpensive implement structurally characterized in such manner that various gardening operations such as weeding, lawn edging, sod removing, cultivating, furrowing, seed covering and hoeing as well as the operations of scraping ice and snow from walks, buildings, et cetera, can be performed with the utmost ease and dispatch.

It is another purpose of our invention to provide an implement of the above described character embodying a bladed element having cutting edges so arranged as to be maintained in a sharpened state over an extended period of use.

We will describe only one form of lawn and garden implement embodying our invention, and will then point out the novel features thereof in claims.

In the accompanying drawing:

Figure 1 is a view showing in plan one form of lawn and garden implement embodying our invention.

Figure 2 is a vertical sectional view taken on the line 2—2 of Figure 1 and looking in the direction of the arrows, with the implement being shown in position for weeding and shallow cultivation by pushing the implement through the soil.

Figures 3 and 4 are enlarged detail sectional views taken respectively on the lines 3—3 and 4—4 of Figure 1 and looking in the directions of the respective arrows.

Figure 5 is a view of the implement in side elevation and in the position for weeding and shallow cultivating by pulling the implement through the soil.

Figure 6 is a view in elevation showing the position of the implement for lawn edging operations.

Figure 7 is a view of the implement in side elevation and showing the position of the implement for furrowing or trenching, and Figure 8 is a view of the implement in side elevation and illustrating the position of the implement for sod removing operations.

Referring specifically to the drawing in which similar reference characters designate similar parts in each of the several views, our invention in its present embodiment comprises a cutting element B constructed from a single sheet of metal to provide flat blades 10 and 10$^a$ diverging from an apex 11 so as to be substantially V-shaped in plan. The outer edge of each blade is stepped intermediate its ends so that the forward or toe portion 12 of the blade is offset transversely and inwardly of the blade from its rear or heel portion 13 to provide a forwardly opening and substantially V-shaped notch 14. The outer edge of each blade is bent laterally and ground on its under surface as indicated at 15 so that cutting edges 16, 17 and 18 are formed respectively along the forward portion 12, notch 14 and rear portion 13.

The inner edge of each blade is parallel to its outer edge and stepped as the latter to provide a substantially V-shaped and rearwardly opening notch 19; and the rear end of each blade is bent laterally along a line substantially 45° with respect to the length of the blade to provide an attaching arm 20. The arms 20 curve inwardly toward each other from their junctures with the respective blades as indicated at 21 and then extend in parallelism so that the spacing between the arms at their free ends is less than that at their junctures with the arms for a purpose to be hereinafter described. The cutting edges 18 of the rear portions 13 of the blades 10 and 10$^a$ continue along the forward or outer edges of the arms 20 as indicated at 22 and function with the cutting edges 17 of the notches 14 in performing edging operations on lawns as will be later described.

The free ends of the arms 20 are pivotally connected by bolts 23 and nuts 24 to the legs 25 of a yoke 26 secured in the present instance by fastening members 27 to a support in the form of a handle H by means of which the cutting element B can be manually manipulated to perform the various operations of which it is capable. By the provision of the bolts 23 and the nuts 24, the element B can be swung to and clamped in various angular positions of adjustment with respect to the handle H in accordance with the particular operations to be performed by the implement.

The arms 20 are provided with circular series of recesses 28 which receive teats 29 projecting from the legs 25 and thus coact with the teats when the nuts 24 are tightened, to positively secure the element B in a selected position of adjustment on the handle.

The operation of the implement is as follows:

To remove weeds from a lawn or the soil by a pushing motion with the implement, the element B is adjusted on the handle H to the position shown in Figure 2. The apex 11 of the element is forced at a slight angle into the soil towards the weed to be removed, and should the cutting edge 16 of one of the forward portions 12 fail upon striking the weed, to sever the latter, the weed will enter the respective cutting notch 14 and either be cut off or uprooted by the notch. The stepping of the outer edges of the blades 10 and 10ª to provide the notches 14, also forms a gage to determine the depth to which the element should be forced into the ground so as to avoid the digging of a larger hole than necessary as well as preventing cutting of a large number of grass roots when the weed to be removed is in a lawn. By swinging the handle downward when the weed enters one of the notches 14, the weed can be withdrawn from the ground, leaving only a substantially T-shaped cut in the surface of a lawn which may be obliterated by pressing down upon the lawn with the apex portion of the element B.

As the element B is pushed along under the surface of the ground in weeding the soil of a garden or under shrubs and bushes so as to effect a shallow cultivation of the ground at the same time, the portions 30 of the yoke 26 scrape the surface and have a tendency to rake the cut weeds and pull them free of the soil so that the weeds will accumulate in the opening of the yoke. During this operation the stepped portions of the inner edges of the blades 10 and 10ª forming the notches 19, break up the soil riding over the blades so that under the scraping action of the portions 30, the soil will be left flat and in a fine state of cultivation. The above operations can be performed equally well with the bladed element adjusted to the position shown in Figure 5, by pulling instead of pushing with the implement as indicated by the arrow in this figure.

Due to the manner in which the cutting edges are formed on the blades, the sliding of the soil against the ground under surfaces of the blade has the tendency to maintain the cutting edges in a sharpened state, as is equally true when the implement is used for scraping soil, ice or snow from walks et cetera.

In using the implement for edging a lawn around plants, tree, walks, foundations et cetera, one blade or the other is inserted edgewise into the soil so that as the implement is advanced through the soil by a pushing operation, with the blade being used, maintained substantially parallel to the surface of the ground as shown in Figure 6, the cutting edge 18 and the cutting edge 17 of the cutting notch 14, will cut through the soil and grass roots so that as the implement is advanced, the severed strip of grass and soil will be cammed upwardly and over to one side in the manner of a plow due to the contour the blade and its respective arm 20 at their juncture, present to the soil in advance thereof. The severed strip of soil and grass passes through the opening of the yoke 26 as the implement is advanced. It is only necessary in such edging operations that the blade be inserted to a depth equal to the length of the cutting edge 17 so that under advancing movement of the implement, the cutting edge 16 of the forward portion 12 will ride over the surface of the lawn and thereby serve to press overhanging grass along the edge, down firmly for cutting by the cutting edge 17 of the notch. When the edge of the lawn being cut is bordered by a walk, the arm 20 of the blade in use, can be rested on the walk and thus serve to gage and regulate the depth to which the soil is penetrated by the blade during the edging operation.

In using the implement for furrowing to plant seeds or for trenching to irrigate, the element B is adjusted to the position shown in Figure 7 and pulled through the soil by the handle, thus causing the diverging blades 10 and 10ª to part and spread the soil to form the furrow. Only the fine sifting portion of the soil will fall in small quantities through the opening between the blades back into the furrow, thereby leaving the soil in the center of the furrow in a fine state of cultivation for the planting of seeds or for irrigation. The diverging inner edges of the blades tend to prevent large clods from falling through the opening between the blades, and operate to force the larger particles off to each side towards the inclined walls of the furrow.

After a furrow has been made and seeds planted therein, the implement can be inverted and the furrow spanned by the bladed element so that by pulling the element over the furrow parallel to its length, the stepped inner edges of the blades 10 and 10ª together with the rear portions 13 of the blades at the juncture thereof with the arms 20, will operate to drag the soil back into the furrow so as to cover the planted seed while the apex portion of the blades presses or packs down the soil drawn back into the furrow. As this is being accomplished, small quantities of soil will slide or fall over the top surfaces of the blades onto the packed smooth surface produced by the apex portion of the blades, so that the soil is prevented from becoming glazed or baked by the sun, thereby enabling the seeds to readily sprout and penetrate through the lower packed soil. Furthermore the projections formed on the outer edges of the blades by the notches 14, aid as a gage for the depth of the furrow; and a string can be passed through the opening of the yoke 26 so that when tied to suitable stakes, a straight line can be followed in furrowing.

In sod removing operations, the element B is adjusted on the handle to the position shown in Figure 8, and the element pushed flatwise through the ground under the sod, the cutting edges 16, 17 and 18 all cooperating to cut through the soil and roots of the grass, and the cutting edges 22 of the arms 20, serving to cut through the soil and grass to define the side edges of the sod which passes through the opening of the yoke 26 as the implement is advanced. As the opening of the yoke decreases in width in a rearward direction from the outer to the inner edges of the blades, the sod in passing through the yoke opening, will be pressed together and thereby packed so that the tendency for the sod to fall apart will be reduced to a minimum. With the element B adjusted for sod removing, the portions 30 of the yoke will ride upon the severed sod as the implement is advanced, to thus serve as a gage for the depth at which the element travels beneath the surface, and thereby insure a uniform thickness of sod. The blades 10 and 10ª are of sufficient width to be effective in precluding tilting of the element in the soil during weeding and sod removing, and in the latter operation, the V-shaped projections formed by the stepped inner edges of the blades are effective to hold the element flatwise at the desired depth, as well as to aid in preventing lateral tilting of the element.

Although we have herein shown and described only one form of lawn and garden implement embodying our invention, it is to be understood that various changes and modifications may be made therein without departing from the spirit of the invention and the spirit and scope of the appended claims.

We claim:

1. An implement of the character described comprising a cutting element having a V-shaped blade presenting forward cutting edges, the rear ends of the blade terminating in laterally projecting arms the confronting sides of which incline towards each other in a direction rearwardly of the element for coaction in compressing the side edges of a sod passing between the arms, and a support including a yoke having legs secured to the arms and co-operating with the latter and blade to define an opening through which a sod cut by the blade is free to pass during advancing movement of the implement.

2. An implement of the character described comprising a cutting element having a V-shaped blade presenting forward cutting edges stepped intermediate their ends to form forwardly opening cutting notches, the inner edges of the blade being stepped intermediate their ends to provide substantially V-shaped and rearwardly extending projections, arms projecting laterally from the rear ends of the blade, and having their confronting sides inclined towards each other in a direction rearwardly of the element, the forward edges of the arms being cutting edges forming continuations of the cutting edges of the blade, a handle including a yoke having legs pivotally connected to the arms, and means for securing the cutting element against pivotal movement on the handle.

3. In an implement of the character described, a cutting element comprising a V-shaped blade, the outer edges of which provide forward cutting edges, the inner edges of the blade being stepped to provide substantially V-shaped and rearwardly extending projections, and arms projecting laterally from the rear ends of the blade and adapted for connection to a support.

OWEN R. BRISTOW.
SAMUEL D. BUNDY.